(12) United States Patent
Hall et al.

(10) Patent No.: US 6,388,447 B1
(45) Date of Patent: May 14, 2002

(54) METHOD AND APPARATUS FOR BATTERY FUEL GAUGING

(75) Inventors: A. Daniel Hall, Gainesville; Richard A. Hudson, Bell, both of FL (US)

(73) Assignee: Moltech Power Systems, Inc., Alachua, FL (US)

( * ) Notice: Subject to any disclaimer, the term of this patent is extended or adjusted under 35 U.S.C. 154(b) by 0 days.

(21) Appl. No.: 09/707,476

(22) Filed: Nov. 7, 2000

(51) Int. Cl.[7] .................................................. H02J 1/04
(52) U.S. Cl. ...................................................... 324/426
(58) Field of Search ................................ 324/426, 430; 320/132, 130; 702/63

(56) References Cited

U.S. PATENT DOCUMENTS 6,252,511 B1 * 6/2001 Mondshine et al. .......... 702/63
6,313,607 B1 * 11/2001 Champlin ................... 320/132

* cited by examiner

Primary Examiner—Peter S. Wong
Assistant Examiner—Pia Tibbits

(74) Attorney, Agent, or Firm—Saliwanchik, Lloyd & Saliwanchik

(57) ABSTRACT

The subject invention pertains to a method and apparatus for recalibrating and/or estimating a battery's state of charge (SOC). The subject invention is advantageous in situations where the battery infrequently, if ever, reaches a full charge and/or a full discharge. In a specific embodiment, the subject method and apparatus can utilize a battery's voltage and/or current, and/or changes in a battery's voltage and/or current with time, to recalibrate and/or estimate the battery's SOC. The method and apparatus of the subject invention can monitor various parameters relating to the condition of the battery in order to determine where on the open circuit voltage (OCV) versus SOC curve, the dOCV/dSOC versus SOC curve, and/or $d^2OCV/dSOC^2$ versus SOC curve the curve the battery is and, in a specific embodiment, when the battery reaches inflection point of the OCV versus SOC curve. Alternatively, the second derivative of the curve can be monitored to determine when the battery is outside a certain region, such as the 30% to 70% SOC region. If desired, the variation of the OCV versus SOC curve with respect to temperature and/or battery age can be taken into account during the determination of SOC in order to enhance the accuracy of such SOC determination.

46 Claims, 10 Drawing Sheets

METHOD AND APPARATUS FOR BATTERY FUEL GAUGING

BACKGROUND OF THE INVENTION

The subject invention relates to the field of battery fuel gauging. The subject method and apparatus provides for an accurate recalibration of a battery's state of charge (SOC) and/or an accurate estimation of a battery's SOC. The subject invention is particularly advantageous for application to batteries which operate such that full discharge and/or full charge of the battery occurs infrequently. It is often important to have an accurate SOC determination so that a reliable prediction can be made as to how much stored energy a battery has remaining and/or to optimize the charging and discharging of the battery.

Traditional battery fuel gauging methods and apparatus utilize hardware and algorithms to detect full charge and/or full discharge and then perform coulometric measurements to estimate the change in the SOC with time. These coulometric measurements typically utilize correction factors to account for battery non-linearities such as charge efficiency, self-discharge, and deliverable capacity. The error in the SOC estimate based on these coulometric measurements will continue to accumulate until a recalibration can occur. The calibration process can involve processing measurable battery parameters that have been empirically, or theoretically, shown to provide a good correlation to a specific SOC. Full charge and/or full discharge are typically considered known SOC points and can then be used to recalibrate the fuel gauge measure and reset the estimated error.

Full charge determinations are dependent upon cell chemistry and are well known in the industry. Full discharge has generally been correlated to an end-of-discharge-voltage (EODV). These calibration methods have been shown to work well in applications such as power tools, computers, cellular phones, etc., where the batteries are allowed to cycle through these known calibration points frequently during normal usage.

However, with respect to some battery applications, the frequency of achieving full charge and/or full discharge is low. For example, in some hybrid electric vehicle (HEV) applications it is preferable that the battery SOC stay within an operating range around a SOC set point. This set point is sometimes referred to as the "sweet spot". As an example, the sweet spot can be 50% SOC with battery SOC preferably confined to an operating range of +/−30%. Accordingly, in this situation, the battery will remain between 20% SOC and 80% SOC and, therefore, will not typically reach the traditional calibration points of a fully charged state and/or a fully discharged state. Accordingly, the error in a SOC estimate based on coulometric measurements will tend to grow with time of use. This growing error can result in undesirable vehicle performance. If the battery SOC estimate is too high, the vehicle can be left with minimal power for peak loads such as climbing hills, acceleration, and restarting the vehicle. If the battery SOC estimate is too low, the vehicle system efficiency can be reduced because of the battery's reduced charge efficiency at high SOC.

Accordingly, there is a need for a method and apparatus for allowing recalibration of a battery's SOC in situations where the battery infrequently, if ever, reaches a fully charged state and/or a fully discharged state. In particular, HEV battery applications which operate within a range centered at a SOC sweet spot need a means of recalibrating the SOC to maintain a more accurate SOC estimate. There is also a need for a method and apparatus for allowing determination of a battery's SOC during the operation of the battery.

SUMMARY OF THE INVENTION

The subject invention pertains to a method and apparatus for estimating a state of charge (SOC) of a battery. A specific embodiment of the subject method comprises generating a curve which expresses the relationship between a parameter and a state of charge of a battery over a region of interest; measuring a voltage and a current of the battery during a period of time to create a set of voltage and current data; processing the set of voltage and current data to create a set of processed data; regressing the set of processed data with respect to an equation which is representative of the battery to obtain a value of the parameter; and comparing the value of the parameter to the curve in order to obtain an estimate of the state of charge of the battery.

The subject method and apparatus can be used to recalibrate a SOC of a battery. The subject invention is advantageous in situations where the battery infrequently, if ever, reaches a fully charged state and/or a fully discharged state. In one embodiment, the subject method and apparatus can utilize a battery's voltage and/or current, and/or changes in a battery's voltage and/or current with time, to recalibrate the battery's SOC and/or estimate the battery's SOC.

Referring to FIG. 1, the open-circuit-voltage (OCV) for many battery chemistries changes monatonically with SOC. Additionally, the OCV versus SOC curve typically has an inflection point. The method and apparatus of the subject invention can monitor various parameters relating to the condition of the battery in order to determine where on the OCV versus SOC curve the battery is and, in a specific embodiment, determine when the battery reaches the inflection point. In a specific embodiment, the method and apparatus of the subject invention can monitor the second derivative of OCV versus SOC and compare with the battery's OCV versus SOC curve to estimate the SOC. The battery's OCV versus SOC curve used for comparison can be determined, for example, prior to use of the battery or during use of the battery. Accordingly, the subject invention can be used to determine when the battery is outside a certain SOC region, such as the 30% SOC to 70% SOC region or the 20% SOC to 80% SOC region. If desired, the variation of the OCV versus SOC curve with respect to, for example, temperature, battery age, charge rate, and/or discharge rate can be taken into account during the recalibration of and/or estimation of SOC in order to enhance the accuracy of such SOC recalibration and/or estimation.

DETAILED DESCRIPTION OF THE INVENTION

The subject invention pertains to a method and apparatus for recalibrating a battery's state of charge (SOC) and/or estimating a battery's SOC. The subject invention is advantageous in situations where the battery infrequently, if ever, reaches a fully charged state and/or a fully discharged state. In one specific embodiment, the subject method and apparatus utilize measured values of a battery's voltage, current, temperature, internal pressure, age (number of cycles), changes in a battery's voltage, and/or changes in a battery's current with time, to recalibrate the battery's SOC and/or estimate the battery's SOC.

Figure 1:
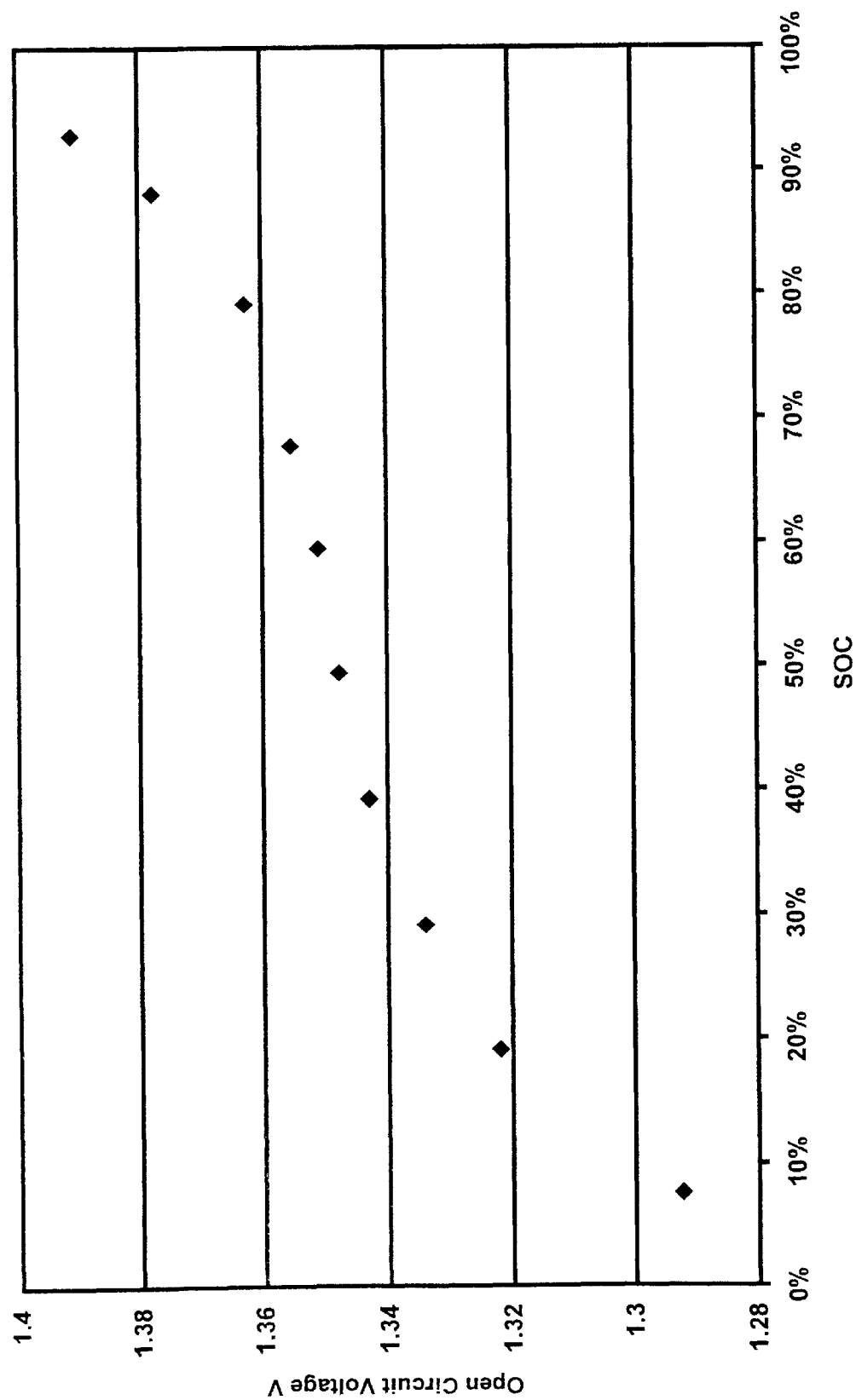
FIG. 1 shows a typical plot of open-circuit-voltage (OCV) versus state of charge (SOC) for a rechargeable battery.
Figure 2:
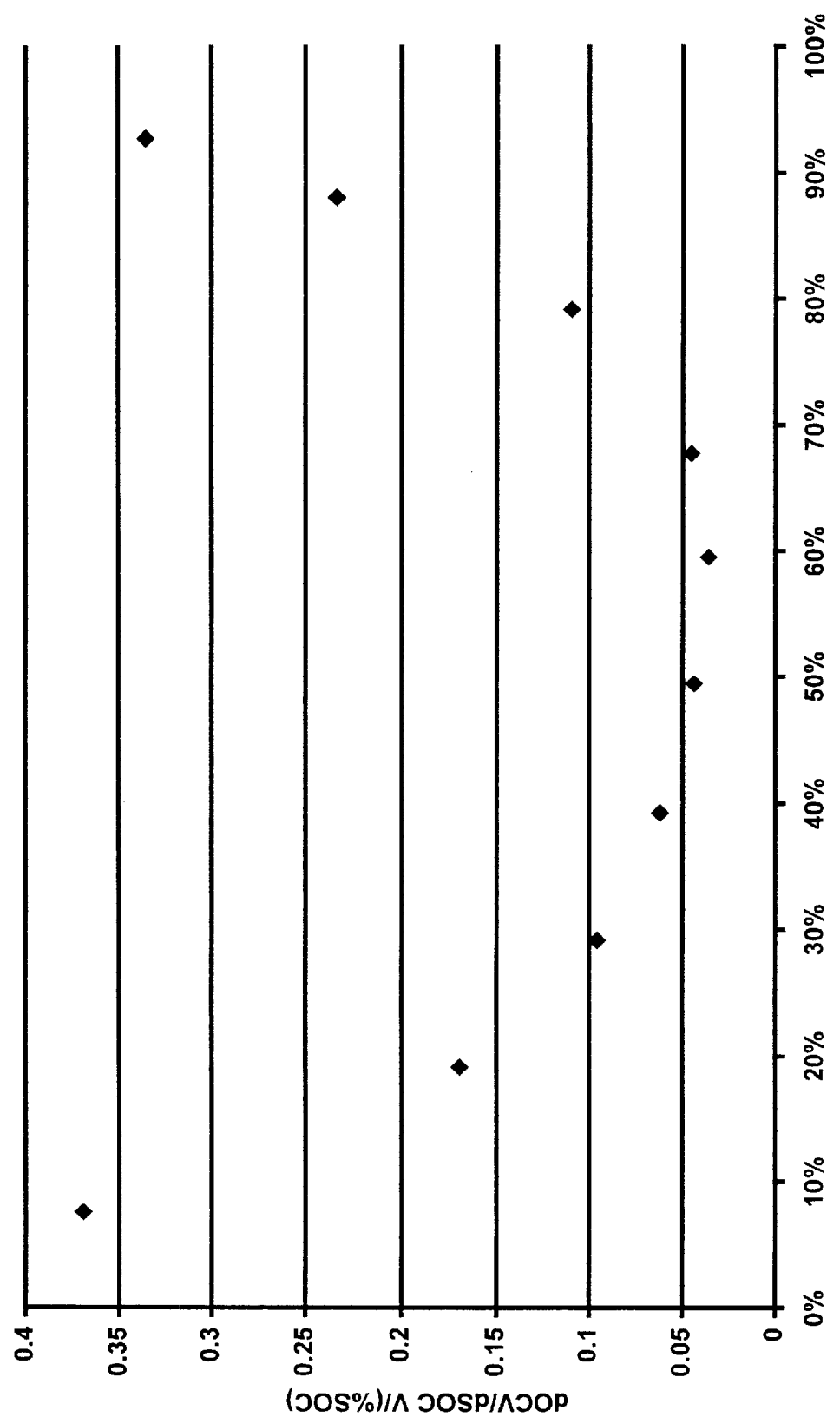
FIG. 2 shows the first derivative (dOCV/dSOC) of the curve shown in FIG. 1.
Figure 3:
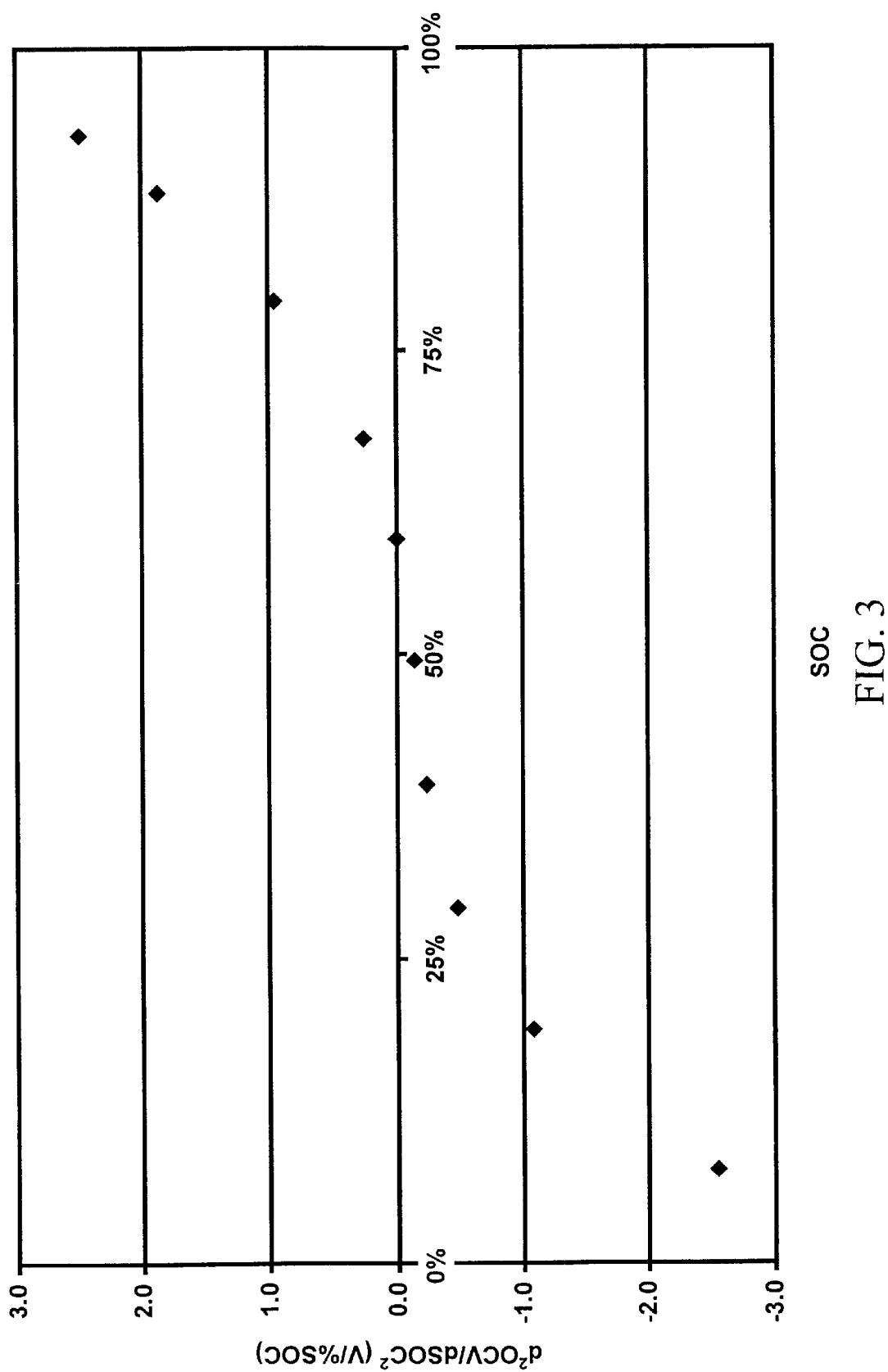
FIG. 3 shows the second derivative ($d^2OCV/dSOC^2$) of the curve shown in FIG. 1.
Figure 4:
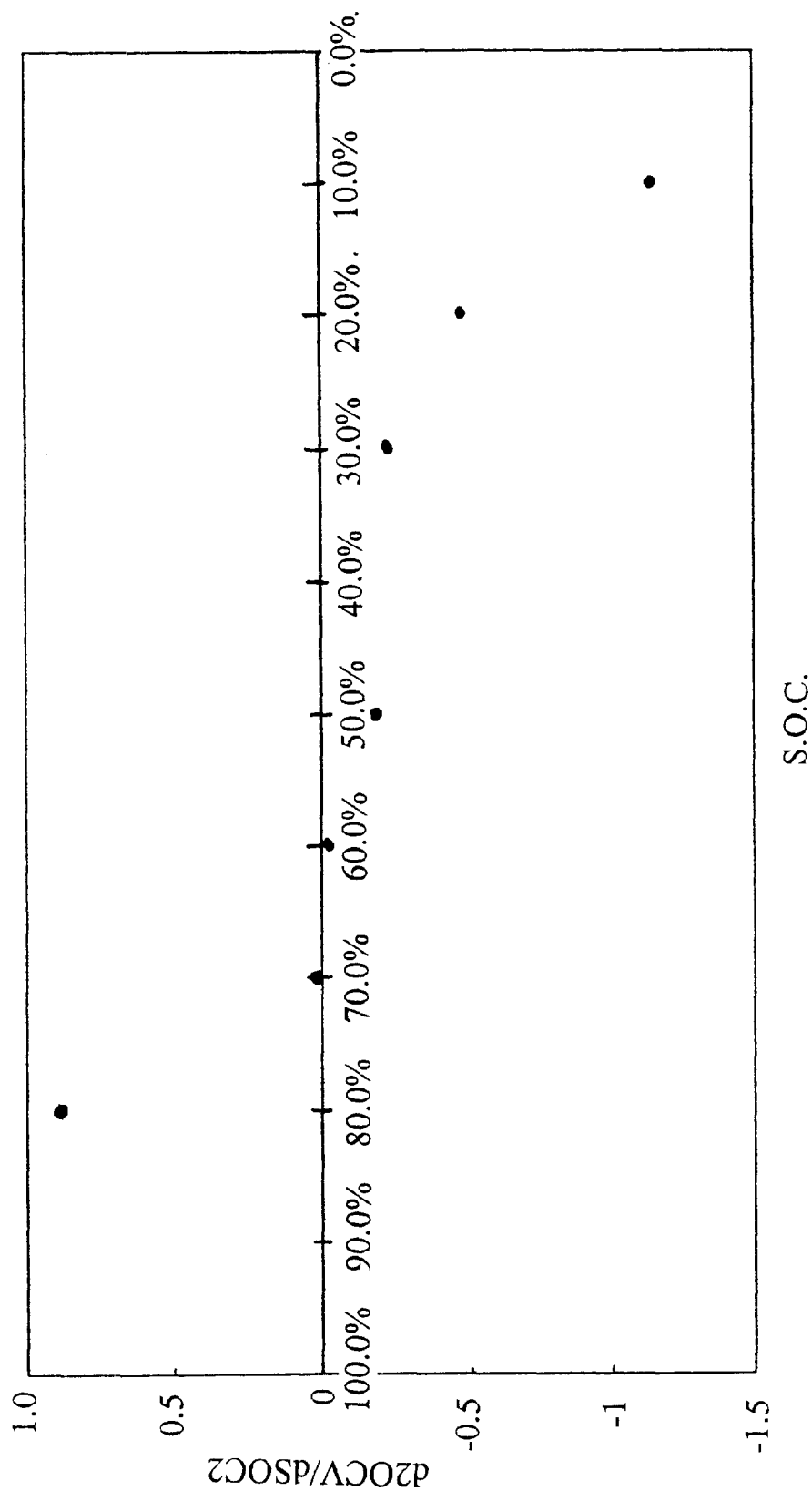
FIG. 4 show experimental results which correspond to the curve of FIG. 3.
Figure 9:
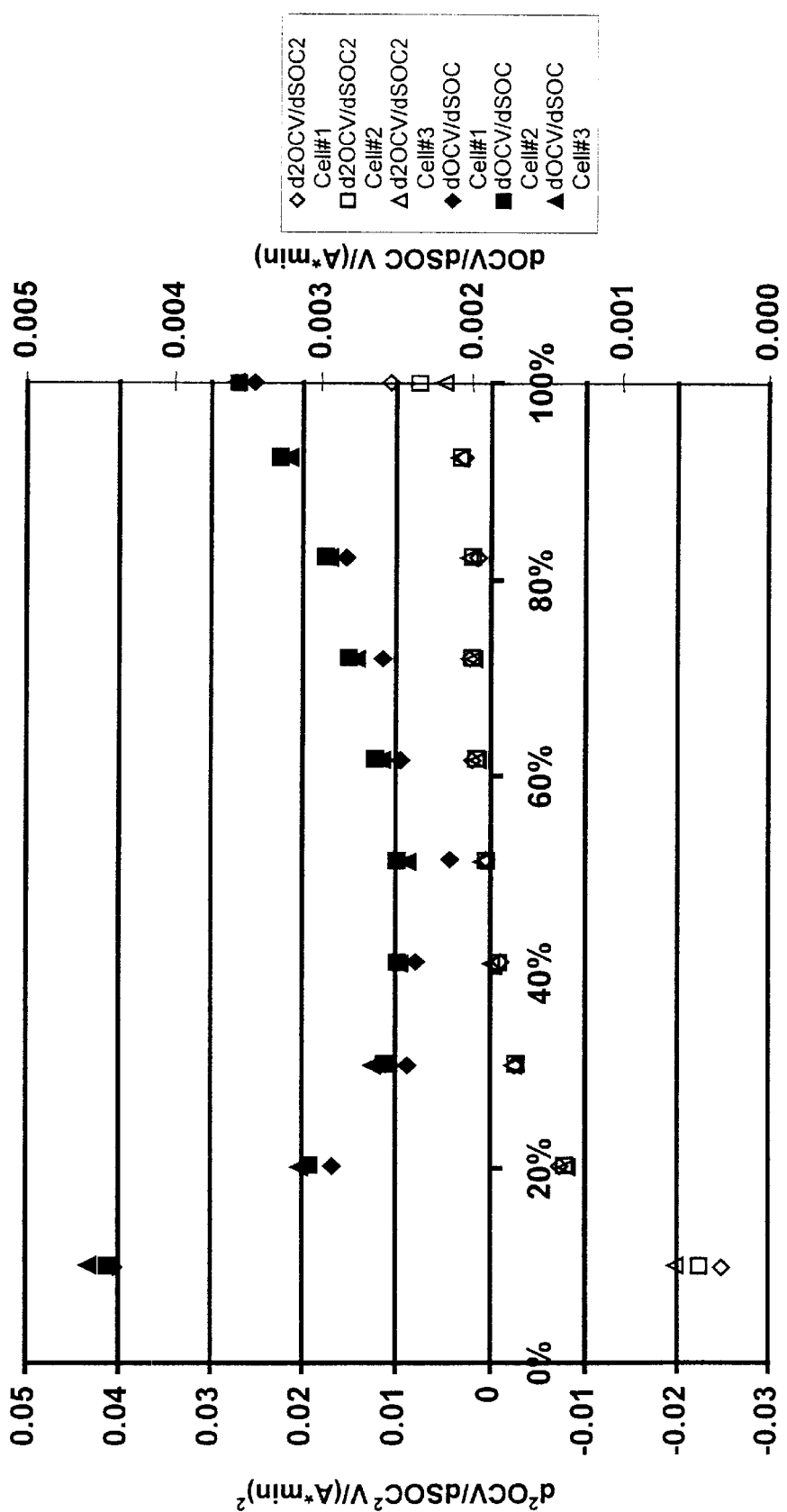
FIG. 9 shows a graph illustrating $d^2OCV/dSOC^2$ versus state of charge and $dOCV/dSOC$ versus state of charge for three same design NiMHD cells under the HPPC test regime with one hour rest before the test regime.

Referring to FIG. 1, which shows a typical plot of open-circuit-voltage (OCV) versus SOC for a rechargeable battery, the OCV for many battery chemistries changes monatonically with SOC. Additionally, the OCV versus SOC curve typically has an inflection point. Such an inflection point in the OCV versus SOC curve can coincide with a minimum in the dOCV/dSOC versus SOC curve, as shown in FIGS. 2 and 9, respectively, and can coincide with a zero-crossing in the $d^2OCV/dSOC^2$ versus SOC, as shown in FIGS. 3, 4, and 9. FIG. 9 shows a plot of $d^2OCV/dSOC^2$ versus state of charge and dOCV/dSOC versus state of charge for three same design NiMH D cells using a one hour rest before the test regime, where the Hybrid Pulse Power Characterization (HPPC) test regime is used.

A variety of methods may be used to generate a curve similar to the curve shown in FIG. 1. For example, the equilibrium voltage can be measured after a certain rest period following a charging or discharging event. In one specific embodiment, the equilibrium voltage is measured after a one hour rest for a series of states of charge. The measurement results can then be recorded in a look up table. Similarly, a polynomial can be curve-fitted to the $OCV_{1hour}$ data. Higher order derivatives such as $dOCV/dSOC_{1hour\ derived}$ and $d^2OCV/dSOC^2_{1hour\ derived}$ can be derived mathematically from the $OCV_{1\ hour}$ data. These derivatives may also be put into a look up table. Alternately, an HPPC profile can be performed at specified states of charge and power rates. For example, for each state of charge, a parameter set can be regressed. The parameter set may include $OCV_{HPPC}$ and $dOCV/dSOC_{HPPC}$, and may be recorded in a look up table. Similarly, additional polynomials can be curve-fitted to the $OCV_{HPPC}$ and $dOCV/dSOC_{HPPC}$ data, and higher order derivatives such as $dOCV/dSOC_{HPPC\ Derived}$ and $d^2OCV/dSOC^2_{HPPC\ Derived}$ can be mathematically derived. These values may also be logged in a separate look up table. The regressed values which correspond to the derived values can then be tracked with SOC.

The $dOCV/dSOC_{1\ hour\ derived}$, $dOCV/dSOC_{HPPC}$ and $dOCV/dSOC_{HPPC\ Derived}$ parameters, in a sense, describe the parameter dOCV/dSOC, such that a better understanding of the parameter dOCV/dSOC may be obtained by each estimate. Although specific values may differ depending on the method used, relations among the methods can be achieved by providing look up tables. In this way a greater accuracy can be obtained for dOCV/dSOC. Other parameters such as battery internal "polarization" resistance, Rp, and battery internal "ohmic" resistance, Ro, may likewise be related to derived quantities.

The method and apparatus of the subject invention can monitor various parameters relating to the condition of the battery in order to determine where on the OCV versus SOC curve the battery is and, in a specific embodiment, when the battery reaches the inflection point of the OCV versus SOC curve. For example, the current (I) and voltage (V) of the battery can be monitored and used to estimate OCV. In another specific embodiment, the method and apparatus of the subject invention can monitor the second derivative of OCV versus SOC ($d^2OCV/dSOC^2$) and compare with the battery's OCV versus SOC curve, such as shown in FIG. 2, to estimate the SOC. Accordingly, the subject invention can determine when the battery is outside a certain SOC region, such as the 30% SOC to 70% SOC region or the 20% SOC to 80% SOC region. If desired, the variation of the OCV versus SOC curve with respect to, for example, temperature, battery age (number of cycles), internal pressure and/or rate can be taken into account during the recalibration of and/or estimation of SOC in order to enhance the accuracy of such SOC recalibration and/or estimation.

The subject invention can be utilized with a variety of battery chemistries and cell sizes. Batteries useful in the practice of the present invention may comprise one or more cells, including but not limited to, D, C, and sub C size cells. With respect to embodiments in which the battery comprises more than one cell, either each individual cell may be monitored, or, alternatively, the whole battery may be monitored.

Figure 5A:
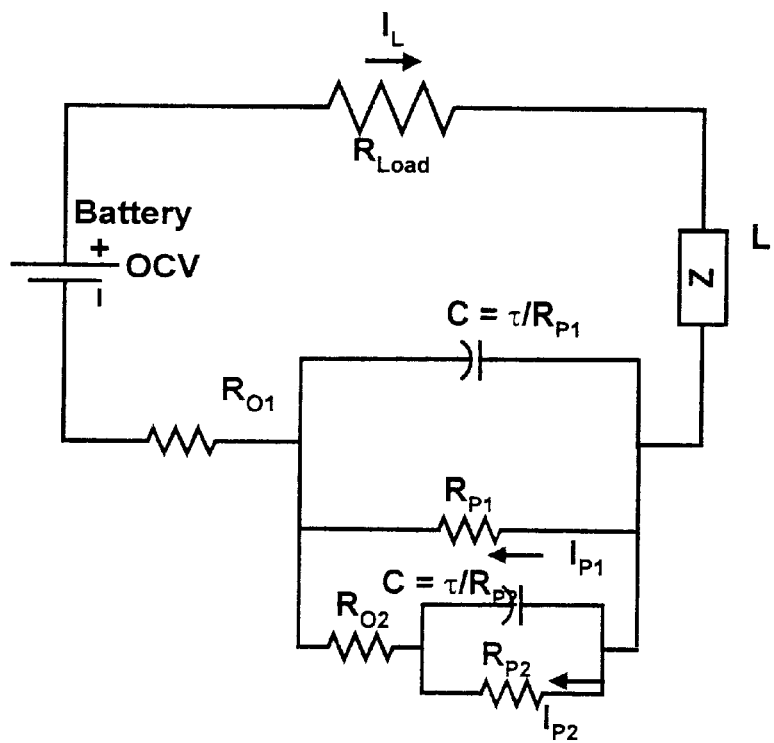
FIG. 5A illustrates one embodiment of a circuit which may be used as an equivalent circuit model of a battery in accordance with the subject invention.
Figure 5B:
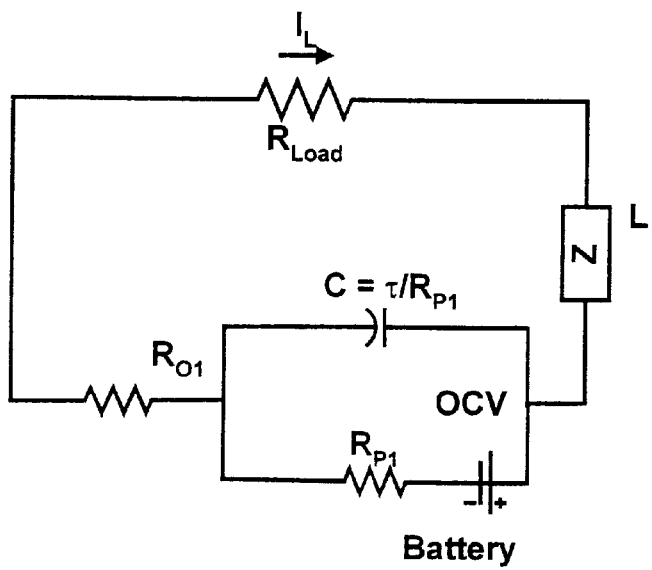
FIG. 5B illustrates one embodiment of a circuit which may be used as an equivalent circuit model of a battery in accordance with the subject invention.
Figure 6:
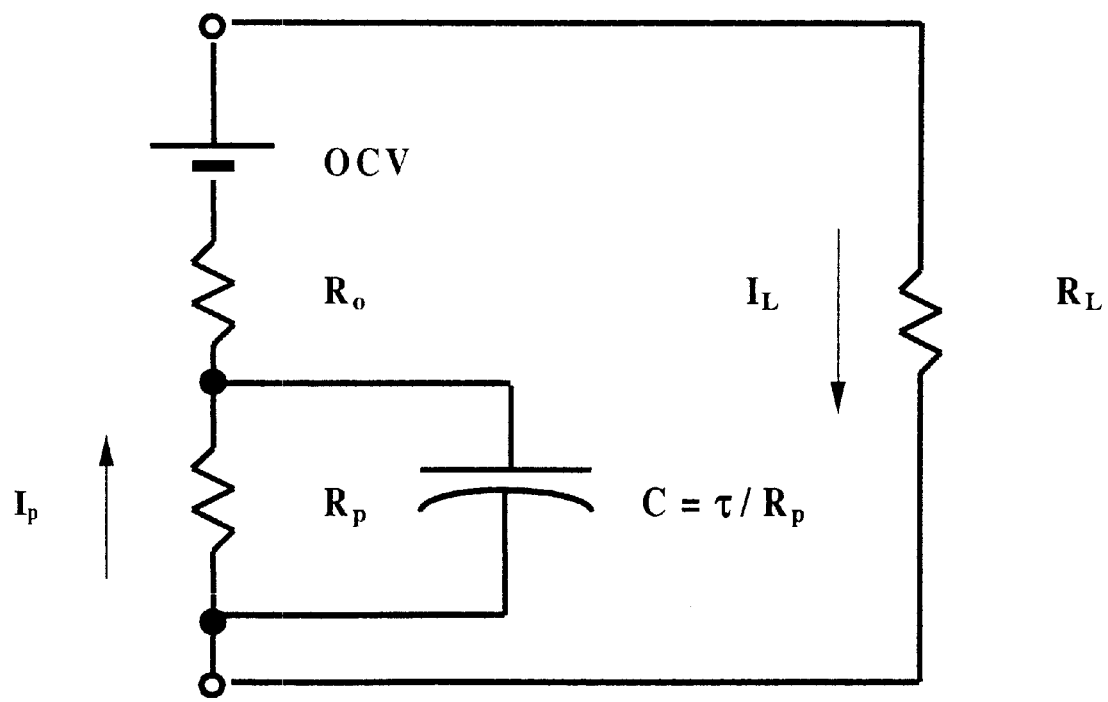
FIG. 6 illustrates one embodiment of a circuit which may be used as an equivalent circuit model of a low internal impedance battery in accordance with the subject invention.

Typically, batteries can be modeled by an equivalent circuit. Examples of such equivalent circuits for a battery are shown in FIGS. 5A and 5B and FIG. 6. The equivalent circuit may be selected based on many factors including battery chemistry and physical parameters of the battery. The equivalent circuit of FIG. 6 has one capacitor-resistor parallel set and a series resistor. The equivalent circuits of FIGS. 5A and 5B are more complicated. The values of the elements of the selected equivalent circuit are affected by battery design parameters including, but not limited to, roll geometry, plate dimensions, electrolyte, separator type, design aspect-ratio, active material, composition density, and collector designs. By using DC current experiments the transient and steady state components of internal impedance and power can be calculated and reproduced. Through analysis of DC current and voltage measurements during cycling of the battery, more accurate details of internal impedance can be extracted. Assuming the equivalent circuit in FIG. 6 describes the battery with reasonable accuracy we can write equations with respect to the voltage response. Various alternate circuits, such as shown in FIGS. 5A and 5B, may be used as equivalent circuit models for the batteries to be fuel gauged.

The voltage during a short discharge (1–2 minutes) can be described as the sum of the open circuit voltage at the state of charge, the voltage drop due to change of capacity (represented by the slope of OCV multiplied by the capacity), the voltage drop due to the ohmic resistances and the voltage drop due to polarization resistances and the impedance drop due to the resistance to current change. The polarization resistances can be associated with cell chemistry and diffusion whereas ohmic resistances can be related to electrical conduction. The selected equivalent circuit can then have a representative equation. As an example, a representative equation corresponding to the circuit model of FIG. 6 can be given as:

$$V_L = I_L * R_L = \qquad (1)$$
$$OCV_{SOC} + \frac{\partial(OCV_{SOC})}{\partial SOC} * \int I_p dt - I_L * R_o - I_p * R_P - \frac{dI_L}{dt}L$$

OCV = Open circuit voltage
SOC = State of Charge
$R_o$ = Battery internal "ohmic" resistance
$R_p$ = Battery internal "polarization" resistance
$R_L$ = External load resistance
C = Shunt capacitance around polarization resistance
$I_L$ = Imposed load current, and
$I_p$ = Current through the polarization resistance.

An example of a generalized equation may be written as:

$$0 = a + b\int I_L dt + cI_L + d\frac{dI_L}{dt} + e\frac{dV}{dt} + fV + g\int V dt + h\frac{d^2 I_L}{dt} + \ldots \qquad (2)$$

where a, b, c, d, e, f, g, h, . . . are coefficients which correspond to the values of the elements and/or parameters of an appropriate equivalent circuit. Other equations can be implemented which incorporate other approximations, such as replacing $I_P$ in equation (1) with an expression in terms of $I_L$. Equation (1) can be considered as a linear summation of V, $I_L$, and derivatives and integrals of V and $I_L$. Accordingly, equation (1) can be placed in the form of equation (2). Similarly, equations derived from the circuit models shown in FIGS. 5A and 5B, as well as others, can also produce equations which can be placed in the form of equation (2). The generalized equation can be truncated as desired to provide the needed degree of accuracy for a particular application. These elements and/or parameters can include, for example, resistances, capacitances, inductances, currents, and voltages. The relationship between the coefficients of the generalized equation and the representative equation corresponding to the selected circuit model can be easily derived and, for typical accuracy needs, can be straightforward algebraic transformations. Other generalized equations can be utilized with the subject invention, which can include, for example, square or higher power terms.

Solving the representative equation, or solving the generalized equation and transforming the generalized equations coefficients into the coefficients for the representative equation, can provide OCV and other parameters which can be useful for recalibrating SOC and/or estimating SOC. In a specific embodiment of the subject invention, a battery voltage and a battery current can be monitored such that at least one set of, and preferably a plurality of sets of, voltage and current data points are measured as a function of time. Preferably, the voltage and current value for each data point should be retrieved such that there is a negligible time lag between the measurement of the voltage and the measurement of the current. The number of data points in each set should be greater than or equal to the number of coefficients in the generalized equation corresponding to the equivalent circuit. In this way the sets of data points can be used to solve the generalized equation for the unknown coefficients.

Figure 7:
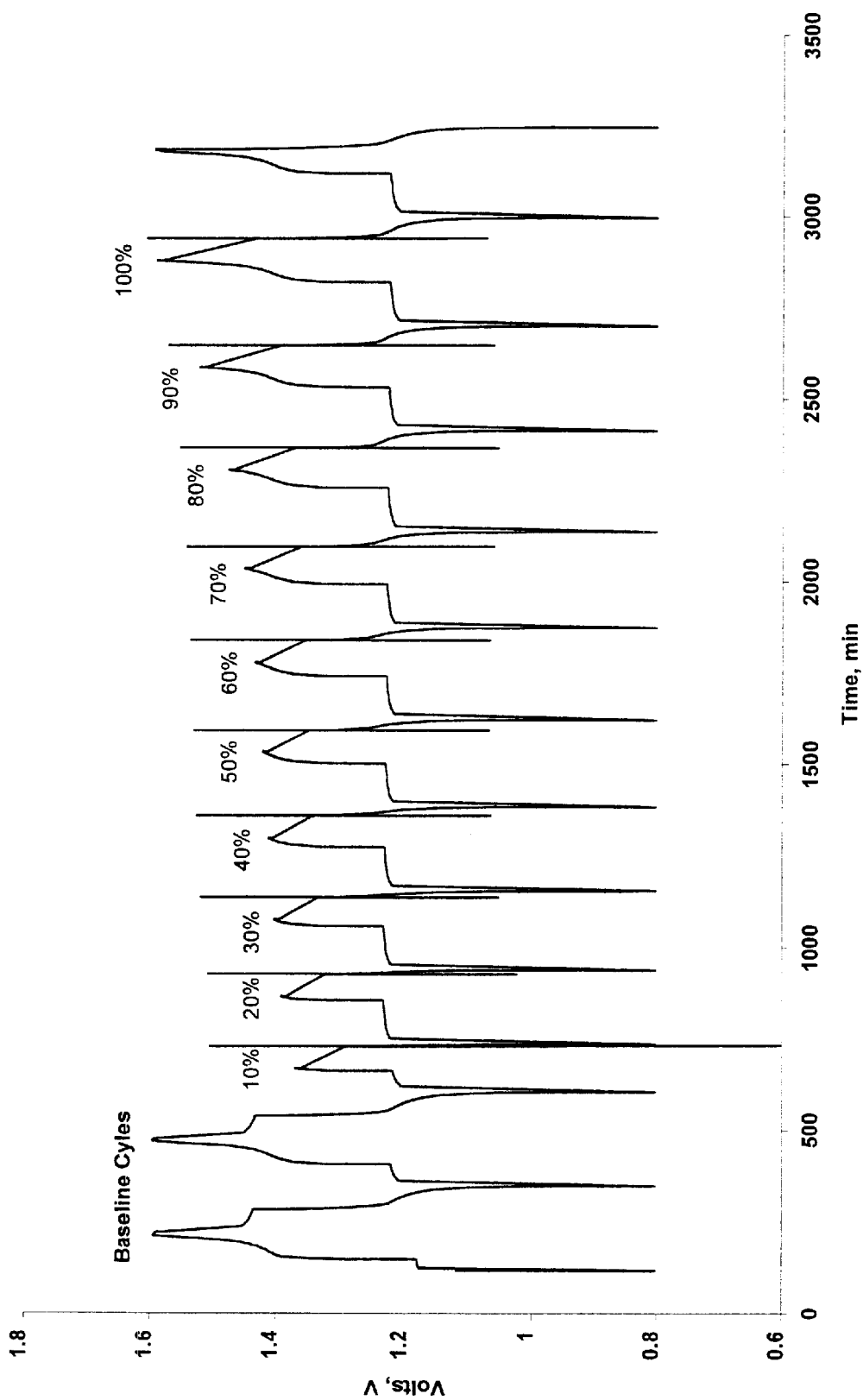
FIG. 7 illustrates a battery pulse power regime in accordance with the subject invention.
Figure 8A:
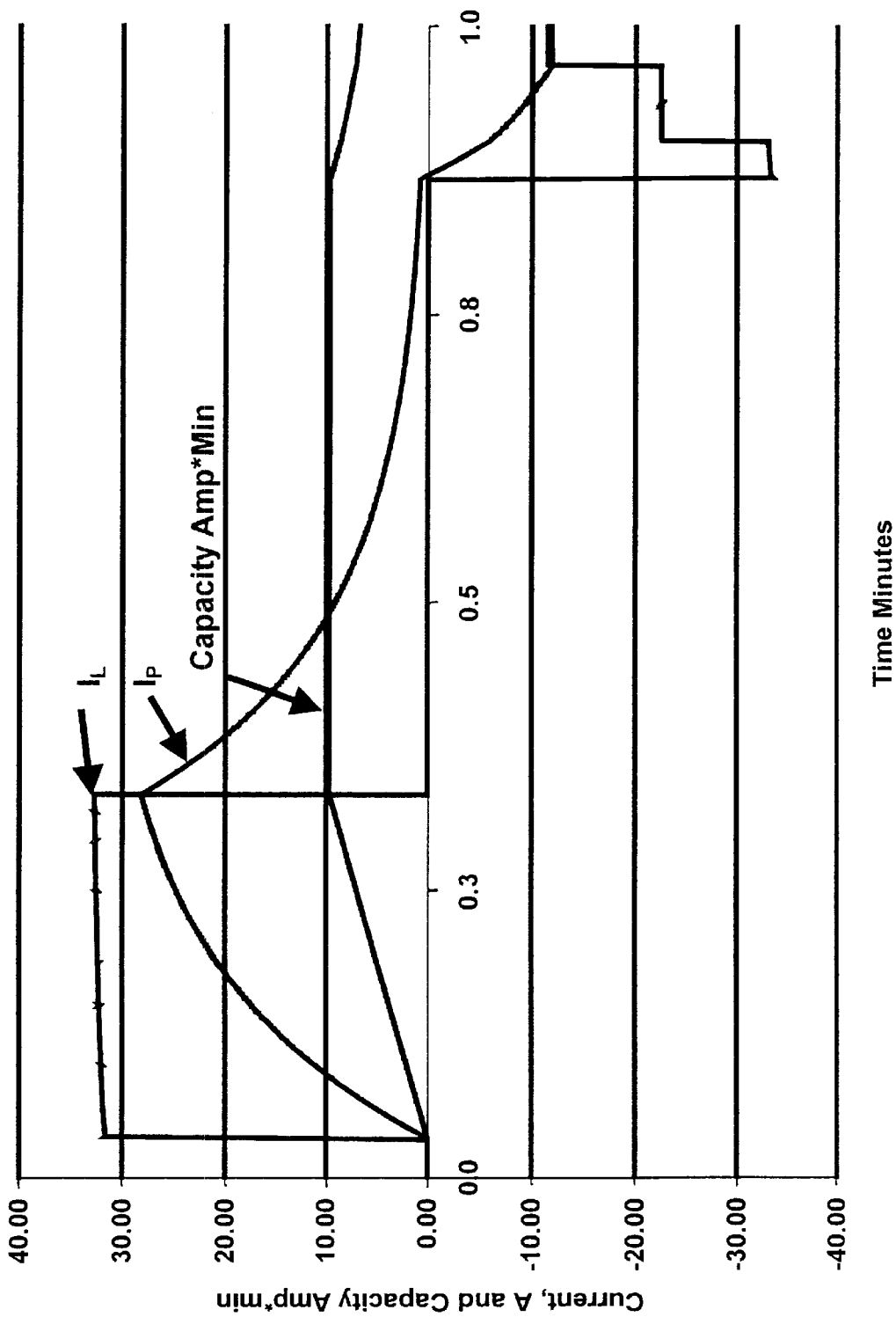
FIGS. 8A & 8B show a graph showing the load voltage $V_L$, currents $I_L$ and $I_P$ and the capacity exchanged AMPH, and the model curve fit $V_L$ est for a 40-watt power discharge, a typical discharge regime at 50% SOC showing four of the input variables for the regression.
Figure 8B:
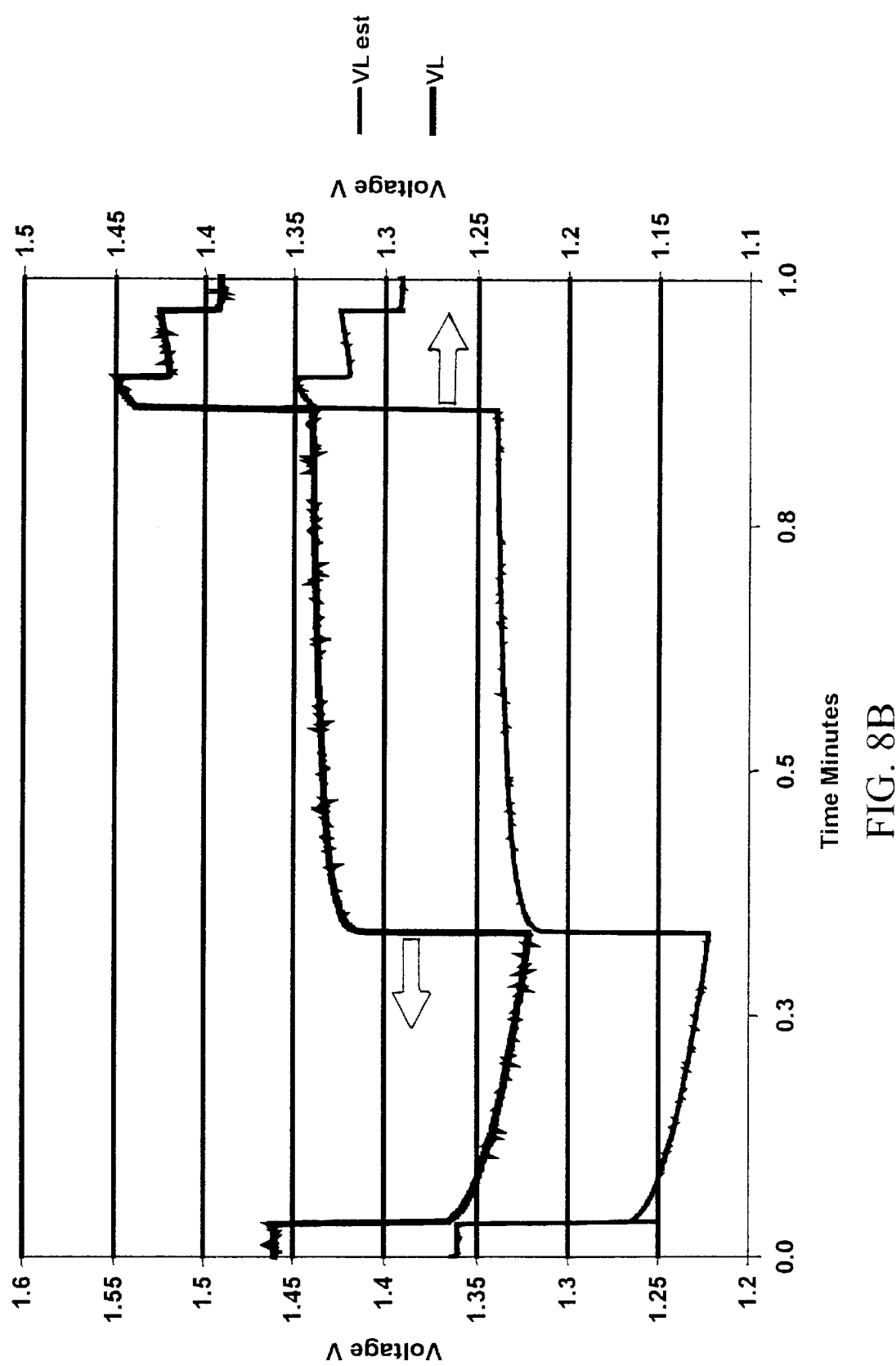

The status of the battery throughout the period during which the voltage and current data is collected can impact the accuracy of the estimated values of the generalized equation coefficients and/or the representative equation parameters. It is preferable to collect voltage and current data throughout a period which includes a discharge portion and a charge portion. It is more preferable for the period to also include a portion where the battery is at rest. In example 1, presented below, a charge/discharge regime is given which can be expected to result in accurate results. This regime is referred to as the Hybrid Pulse Power Characterization (HPPC) dynamic load profile and is described in *PNGV Battery Test Manual,* Revision 1, Idaho National Engineering Laboratory, published May 1998, Department of Energy, Reference ID-10597. FIG. 7 shows a regime similar to the HPPC regime. The HPPC test regime lasts for one minute and includes a charge portion, a discharge portion, and a rest portion. FIGS. 8A and 8B show a graph showing the load voltage $V_L$, currents $I_L$ and $I_P$ and capacity exchanged amp-minutes, and $V_L$ est for a 40-watt discharge, during one of the voltage spikes shown in FIG. 7. The HPPC regime was designed, at least in part, to simulate what a hybrid electric vehicle (HEV) battery might experience under actual driving conditions. For example, the vehicle may accelerate for 18 seconds, discharging the battery, to reach a desired speed; cruise at a constant speed for 32 seconds, resting the battery, where the combustion engine performs the work; brake hard for two seconds where kinetic energy from the vehicle is used to charge the battery at a high rate; brake for 4 more seconds where more of the vehicle's kinetic energy is used to charge the battery; and brake lightly for 4 seconds where the vehicle's remaining kinetic energy is used to further charge the battery. At this point, the regime could also add another rest portion which might occur, for example, while the vehicle is at a red light.

However, when the battery is in actual use, it may not always be possible to achieve a repeatable regime which necessarily occurs with regularity. Accordingly, as voltage and current data is collected, the data can be monitored so as to select periods of time during which the battery undergoes at least a minimum duration of one or more desired states. For example, a minimum duration of battery discharging, battery charging, and/or battery rest can be used as criteria to select a period of time. In one embodiment the voltage and current measurements can be monitored in a continuous manner and a period of time selected based on at least one predetermined criterium relating to the voltage and/or current measurements. For example, a period of time may be less than or equal to 60 seconds. Examples of predetermined criteria include, but are not limited to, at least 15 seconds of discharging or at least 15 seconds of charging during said period of time. The sequential order of these events can also be taken into account, as well as magnitudes of the discharging and/or charging. A specific example may screen for any one minute interval which includes at least 15 seconds of discharge at a rate of at least 15 watts, at least 15 seconds of charge at a rate of at least 10 watts, and at least 15 seconds of rest where the charge or discharge rate is less than one watt. Other criteria can be used and the time interval adjusted as desired. The criteria can also be modified in accordance with the accuracy dictated by the application, the battery chemistry, and/or other factors. When such criteria are met, the data associated with the selected periods can then be used in the regression.

An alternative to continuous monitoring of the voltage and current data is to periodically, or at some selected time sequence, electrically isolate the battery from the application and cycle the battery through a predetermined regime. The regime can be selected to provide the appropriate accuracy. Preferably, the period of time that the battery is isolated is minimized. For example, a period of one to two seconds may provide sufficient accuracy.

In a preferred embodiment, regression techniques can be used to solve for the coefficients of the generalized equation. An example of a linear regression technique which may be utilized with respect to the subject invention is described in Appendix D of *PNGV Battery Test Manual*, Revision 1, Idaho National Engineering Laboratory. The coefficients produced by the regression can then be used to solve for the values of the elements and/or parameters in the equivalent circuit, for example through algebraic transformations. In a specific embodiment, these parameters include the OCV and the slope of the OCV with respect to SOC. By utilizing multiple sets of data points for the battery voltage and current, derivative functions of the coefficients can be achieved, as well as second derivative functions of the coefficients. For example, the second derivative of OCV with respect to SOC can be achieved. The derivative and second derivative functions of the coefficients can be useful for recalibrating, and/or estimating SOC.

As discussed, a linear regression method can be used to assign values to the coefficients in the generalized equation and/or the values of the elements and/or parameters in the equivalent circuit. This regression may be calculated by a variety of methods. For example, voltage and current measurements with time, as well as derivative and integral methods, can be used. Regressions can be calculated by, for example, looking at the derivations of $\int V\, d(SOC)$, $\int V\, dt$, and/or $\int V\, dI$. Second order terms revealing the curvature from a single discharge can also be utilized. Although derivatives, such as $dV/d(SOC)$, $dV/dt$, and $dV/dI$, can be somewhat noisy, their integrals with respect to time, state of charge, and/or current can provide additional information. Each method can potentially add a unique bit of information in order to make the calculation more accurate.

In a specific example, the OCV, slope of OCV, and/or other parameters can then be charted with SOC, where the SOC can be measured independently. From this data the curvature of one or more of the coefficients of the generalized equation and/or elements and parameters in the equivalent circuit versus state of charge can be generated. In a specific embodiment, the curvature of OCV versus SOC, dOCV/dSOC versus SOC, and/or $d^2OCV/dSOC^2$ versus SOC can be generated and can be useful in recalibrating SOC and/or estimating SOC. The curvature of these coefficients and/or parameters versus state of charge can be unique for each cell type. If a discrepancy exists, additional information may be provided by the internal resistances and the OCV. In a specific embodiment, a mathematical relationship between the slope of the OCV and the state of charge can be fitted to collected cell data. The mathematical relationship between the slope of the OCV and temperature and/or battery age can also be fitted to specific cell data. The curvature of the various coefficients and/or parameters with respect to SOC can then be stored for later comparison and/or used to create a mathematical model to represent the equivalent circuit for the battery. These curves can be stored in, for example, look-up tables, for referencing at a latter time.

Referring to equation 1, which corresponds to the circuit of FIG. 6, the equation variables are $I_L$, $I_P$, $dI_L/dt$, and $\int I_P dt$, and the regression constants are $I_P$, $R_P$, $R_o$, OCV, and $\partial OCV/\partial SOC$. One or more data sets of battery voltage and current can be measured for regression. The equation variables, $I_L$, $I_P$, $dI_L/dt$, and $\int I_P dt$ can be calculated for each regression point. As the state of charge of the battery changes, the regression can be repeatedly performed. Accordingly, the values of the regression constants can be updated with time. Terms such as $I_L$, and $dI_L/dt$ can be derived from the current measurements and can therefore be given a value by keeping track of $I_L$. By contrast, the variable $I_P$ can be calculated through, for example, the following equation based on the model of FIG. 6:

$$\tau \frac{dI_P}{dt} = I_L - I_P \qquad (3)$$

An approximate capacitive time constant, $\tau$, can be utilized in order to calculate, through a difference equation, $I_P$ as a function of $I_L$ and time. As errors can build quickly, it is preferable to use a large amount of points with the difference equation to enhance accuracy. Once a value for the variable $I_P$ is achieved, the regression can be performed. In addition, once the initial calculation is complete, better estimates for the regression constants can be achieved by varying the capacitive time constant in order to minimize the error of the regression. Although this technique seems adequate, in practice it can become cumbersome to calculate the variable $I_P$, as the difference equation can require a significant amount of memory and calculation time.

In a specific embodiment, a linear summation of derivatives and integrals of the voltage is utilized, such that the calculated variable $I_P$ can be replaced by the measured variable $I_L$. This replacement can be achieved through a replacement of $I_P$ in equation (1) with an expression for $I_P$ derived from equation (3), such that $I_P$ is no longer in the modified equation (1). This substitution can simplify the regression significantly. The following equation can be constructed by adding the derivatives of equation (1) multiplied by the capacitive time constant to equation (1) and substituting the $$I_P + \tau \frac{dI_P}{dt}$$

terms with $I_L$ terms in accordance with the relationship described in equation (3) and the integration of equation (3).

$$V_L = OCV_{SOC} + \frac{\partial(OCV_{SOC})}{\partial SOC} \int I_L dt + (R_o + R_P)I_L + \tau R_o \frac{dI_L}{dt} - \tau \frac{dV_L}{dt} \qquad (4)$$

This equation does not have the $I_P$ term, thus allowing a more direct calculation.

In a specific embodiment, an estimate of a battery's SOC can then be made by tracking the battery's OCV, dOCV/dSOC, and/or $d^2OCV/dSOC^2$. The shape of the OCV, dOCV/dSOC, and $d^2OCV/dSOC^2$ curves with respect to SOC can be determined by theory or experiment, and need only be generated over a region of interest. For example, the shape of one or more of the curves can be determined prior to use of the battery and then used during the use of the battery for SOC recalibration and/or estimation. Alternatively, or in conjunction with a pre-measured curve, the shape of one or more of the curves can be determined on the fly during the use of the battery. Comparison of the OCV, dOCV/dSOC, and/or $d^2OCV/dSOC^2$ data with the stored data with respect to the shape of the curves can then be used to recalibrate the SOC and/or provide an estimate of the SOC.

One or more of the battery's OCV versus SOC curve, dOCV/dSOC versus SOC curve, and $d^2OCV/dSOC^2$ versus SOC curve can be modeled as a mathematical function. With respect to a specific NiMH D cell based battery, $d^2OCV/dSOC^2$ can be approximated as a straight line with a constant slope. Furthermore, the zero intercept of $d^2OCV/dSOC^2$ can be modeled to reside at a known SOC. Accordingly, when $d^2OCV/dSOC^2$ is zero, SOC can be recalibrated at this known SOC value. Also, SOC can be estimated for other values of $d^2OCV/dSOC^2$ by using the shape of the $d^2OCV/dSOC^2$ curve. For an embodiment where $d^2OCV/dSOC^2$ is modeled as a straight line, the constant slope (0.011 mV/Ah$^2$ for a specific NiME D cell) and the known SOC can be used to estimate the SOC for a particular value of $d^2OCV/dSOC^2$. The slope of the $d^2OCV/dSOC2$ may change, for example, with temperature and/or battery age, and these changes can be taken into account, if desired.

In addition to the equations discussed above, the following equations can be utilized for regressions on voltage and current data with respect to the equivalent circuit of FIG. 6:

$$\tau \frac{dI_p}{dt} = I_L - I_p \quad (5)$$

$$V = OCV\left(1 + \frac{t}{\tau}\right) + \frac{(R_p + R_o)}{\tau} \int I_L dt + \quad (6)$$

$$R_o I_L + \frac{dOCV}{dSOC} * \frac{1}{\tau} \int \int I_L dt - \int \frac{Vdt}{\tau}$$

$$V = OCV + \frac{dOCV}{dSOC} \int I_L dt + (R_o + R_p)I_L + \tau R_o \frac{dI_L}{dt} - \tau \frac{dV}{dt} \quad (7)$$

$$V = OCV + \frac{dOCV}{dSOC} \int I_p dt + R_p I_p + R_o I_L \quad (8)$$

Measured variables:
 $I_L$=Current, V=Voltage, and t=time.
Variables calculated:
 $I_p$=Polarization Current
 Various derivatives of Voltage and Current
Variables regressed:
 $R_p$=Polarization Resistance
 $R_o$=Electronic Resistance
 OCV=Open Circuit Voltage
 dOCV/dSOC=Change of open circuit voltage with state of charge
 τ=capacitive time constant Equation 8 is identical to equation 1 without the $dI_L/dtL$ term. If we integrate equation (4) assuming no integration constants, equation (6) can be generated. Equation (7) can be noisy due to the derivative terms, whereas equation 6 is less noisy due to the integral terms. Accordingly, equations 5 and 8 together, equation 6 alone, or equation 7 alone can be used for regression.

EXAMPLE 1

As discussed above, the voltage and current measurements can be taken during various battery charging and/or discharging regimes. A specific embodiment of the subject invention involves the following:

1. Performing a consistent and reproducible charging and discharging cycle with a fixed time and rate. For example, a cell can be cycled through the following events:
   discharge the cell for 18 seconds at 40 Watts;
   rest the cell for 32 seconds;
   charge the cell for 2 seconds at 48 Watts;
   charge the cell for 4 seconds at 32 Watts;
   charge the cell for 4 seconds at 16 Watts; and
   record the cell voltage and time throughout the cycle.
   This is referred to as the Hybrid Pulse Power Characterization (HPPC) dynamic load profile described in the *PNGV Battery Test Manual,* Revision 1, Idaho National Engineering Laboratory.

2. The following calculations can then be performed from the data and mapped to the state of charge:
   calculate OCV; and
   calculate dOCV/dSOC.
   These calculations can be performed by the application of equation 6 and the techniques described in the *PNGV Battery Test Manual,* Revision 1, Idaho National Engineering Laboratory. Alternative methods of performing these calculations can also be utilized, for example by application of equations 7 and 8.

3. The state of charge can then be moved a small percentage and the cell recycled through the same consistent and reproducible cycle with a fixed time and rate. From this second set of data a second set of calculations listed under step 2 above can be performed. If desired, additional sets of data may be obtained, and corresponding additional sets of calculations performed.

4. Once two sets of calculations are performed for two states of charge, the following additional calculations can be performed:
   from the two OCV points calculate the slope of OCV with state of charge; and
   from the two dOCV/dSOC points calculate the slope of dOCV/dSOC with state of charge.
   Again, it may be preferable to obtain additional data sets and corresponding sets of calculated values. In a specific embodiment, five data sets are utilized and the five sets of corresponding calculated values are used to perform these additional calculations.

5. If desired, steps 1–4 can then be repeated to get multiple values for the calculated slopes. These multiple slope values can then be used to calculate an average slope with state of charge. In a specific embodiment, steps 1–4 can be repeated five times to generate 5 values for calculated slopes to average.

6. Using the convention that state of charge (SOC) is a positive quantity, the SOC can then be compared with predetermined calibration points, with adjustments made to SOC if necessary. Various points can provide a reference for re-calibration. If desired, minor adjustments can be made for temperature variations and specific battery designs. In a specific embodiment, as shown in FIG. 9, these points which can be used to provide a reference include but are not limited to the following:
   a. when $d^2OCV/dSOC^2$=0, SOC=40%, when $d^2OCV/dSOC^2$>0, SOC>40%, when $d^2OCV/dSOC^2$<0, SOC<40%; and
   b. dOCV/dSOC>0 everywhere.

Although the steps outlined in this example would be difficult to accomplish during actual use of a battery, these steps can be utilized in a laboratory setting to initially characterize a battery. Such an initial characterization can produce an OCV versus SOC curve, a dOCV/dSOC versus SOC curve, and/or a $d^2OCV/dSOC^2$ versus SOC curve which can then be used as a reference to compare values obtained from regression in order to recalibrate and/or estimate the battery's SOC. For example, the values from an initial characterization may be stored in a look-up table for such comparison.

EXAMPLE 2

In a manner similar to Example 1, alternative parameters, including battery internal "polarization" resistance ($R_p$), battery shunt capacitance around polarization resistance (C), battery internal "ohmic" resistance ($R_O$), $dR_P/dSOC$, and/or $dR_O/dSOC$, can be obtained from regression and utilized to provide estimations of the battery's state of charge (SOC) and/or recalibration of the battery's SOC.

EXAMPLE 3

FIGS. 5A and 5B illustrate two more equivalent circuits which can be used as models of a battery in accordance with the subject invention. In FIG. 5A, $R_{O1}$ is the electronic resistance and $R_{O2}$ is the pure resistance. In FIG. 5B, $R_{O1}$ is the electronic resistance. The following equation can be used with respect to the circuit of FIG. 5B.

$$V_L = I_L * R_L = OCV_{SOC} + \frac{\frac{\partial(OCV_{SOC})}{\partial SOC}}{\left[1 - C * \frac{\partial(OCV_{SOC})}{\partial SOC}\right]} * \int I_L dt - I_L * \left[\frac{R_o + R_P}{\left[1 - C * \frac{\partial(OCV_{SOC})}{\partial SOC}\right]}\right] - \frac{dI_L}{dt} L - \frac{dV_L}{dt} * C * \frac{R_P}{\left[1 - C * \frac{\partial(OCV_{SOC})}{\partial SOC}\right]} \quad (9)$$

The former equation variables are $I_L$, $dI_L/dt$, $\int I_L dt$ and the regression constants are $R_p$, $R_o$, OCV, and dOCV/dSOC and C, where C is the capacitance of the battery. A corresponding equation for the circuit of FIG. 5A can also be determined from the circuit shown in FIG. 5A.

It should be understood that the example and embodiments described herein are for illustrative purposes only and that various modifications or changes in light thereof will be suggested to persons skilled in the art and are to be included within the spirit and purview of this application and the scope of the appended claims.

What is claimed is:

1. A method for estimating a state of charge of a battery, comprising:
   generating a curve which expresses the relationship between a parameter and a state of charge (SOC) of a battery over a region of interest;
   measuring a voltage and a current of the battery during a period of time to create a set of voltage and current data;
   processing the set of voltage and current data to create a set of processed data;
   regressing the set of processed data with respect to an equation which is representative of the battery to obtain a value of the parameter; and
   comparing the value of the parameter to the curve in order to obtain an estimate of the state of charge of the battery.

2. The method according to claim 1, wherein processing the set of voltage and current data comprises differentiating voltage and current data from the set of voltage and current data.

3. The method according to claim 1, wherein processing the set of voltage and current data comprises integrating voltage and current data from the set of voltage and current data.

4. The method according to claim 1, wherein processing the set of voltage and current data comprises integrating current data from the set of voltage and current data.

5. The method according to claim 1, wherein said curve is generated prior to normal operation of the battery.

6. The method according to claim 1, wherein said curve is generated during normal operation of the battery.

7. The method according to claim 1, wherein the battery is electrically isolated during the period of time.

8. The method according to claim 7, wherein the battery is cycled through a predetermined regime during the period of time.

9. The method according to claim 1, wherein said curve is stored in one or more look-up tables.

10. The method according to claim 1, wherein said curve is represented as a mathematical function.

11. The method according to claim 10, wherein the mathematical function is a straight line.

12. The method according to claim 1, wherein said region of interest is between about 20% state of charge and about 80% state of charge, wherein said method is utilized for estimating a state of charge of a battery which has a state of charge between about 20% state of charge and about 80% state of charge.

13. The method according to claim 1, wherein said region of interest is between about 30% state of charge (SOC) and about 70% SOC, wherein said method is utilized for estimating a SOC of a battery which has a state of charge between about 30% SOC and about 70% SOC.

14. The method according to claim 1, wherein said parameter is selected from the group consisting of: open circuit voltage (OCV), dOCV/dSOC, $d^2OCV/dSOC^2$, battery internal "polarization" resistance ($R_P$), $dR_P/dSOC$ battery shunt capacitance around polarization resistance (C), battery internal "ohmic" resistance ($R_O$), and $dR_O/dSOC$.

15. The method according to claim 14, wherein said parameter is OCV.

16. The method according to claim 14, wherein said parameter is dOCV/dSOC.

17. The method according to claim 14, wherein said parameter is $d^2OCV/dSOC^2$.

18. The method according to claim 14, wherein said parameter is $R_P$.

19. The method according to claim 14, wherein said parameter is $R_O$.

20. The method according to claim 14, wherein said parameter is $dR_P/dSOC$.

21. The method according to claim 14, wherein said parameter is $dR_O/dSOC$.

22. The method according to claim 1, wherein said battery is discharging during a first portion of said period of time.

23. The method according to claim 22, wherein said battery is charging during a second portion of said period of time, wherein said second portion is before or after said first portion.

24. The method according to claim 23, wherein said battery is at rest during a third portion of said period of time, wherein said third portion is before or after said first portion, and is before or after said second portion.

25. The method according to claim 1, wherein said equation is a generalized equation corresponding to the battery.

26. The method according to claim 25, wherein coefficients of the generalized equation are related to coefficients of an equation representing an equivalent circuit corresponding to the battery.

27. The method according to claim 10, wherein said parameter is $d^2OCV/dSOC^2$ and said curve is represented as a straight line.

28. The method according to claim 27, wherein when $d^2OCV/dSOC^2$ has a value of zero the state of charge of the battery is recalibrated to a known state of charge.

29. The method according to claim 28, wherein a value of zero occurs when $d^2OCV/dSOC^2$ transitions from positive to negative or from negative to positive.

30. The method according to claim 1, wherein said battery is cycled through a predetermined regime during said period of time.

31. The method according to claim 31, wherein said predetermined regime is the HPPC dynamic load profile.

32. The method according to claim 1, wherein said battery is a NiMH battery.

33. The method according to claim 1, wherein said battery comprises one or more cells selected from the group consisting of a: D cell, a C cell, and a sub C cell.

34. The method according to claim 1, wherein the voltage measurements and the current measurements are monitored in a continuous manner, and wherein said period of time is selected based on at least one predetermined criterium relating to the voltage measurements and the current measurements.

35. The method according to claim 34, wherein said period of time is less than or equal to 60 seconds.

36. The method according to claim 35, wherein one of said at least one predetermined criterium is at least 15 seconds of discharging during said period of time.

37. The method according to claim 36, wherein another of said at least one predetermined criterium is at least 15 seconds of charging during said period of time.

38. The method according to claim 1, wherein the variation of the curve with respect to one or more of the following is taken into account during comparing the value of the parameter to the curve: battery temperature, battery age, internal pressure, and charging/discharging rate.

39. The method according to claim 26, wherein the equation representing the equivalent circuit is a function of the voltage and the current of the battery and derivatives and integrals of the voltage and the current of the battery.

40. The method according to claim 25, wherein the equation representing the equivalent circuit has the following form:

$$0 = a + b \int I_L dt + cI_L + d\frac{dI_L}{dt} + e\frac{dV}{dt} + fV + g \int V dt + h\frac{d^2 I_L}{dt^2} + \ldots .$$

41. The method according to claim 25, wherein the equation representing the equivalent circuit includes square or higher power terms.

42. The method according to claim 26, wherein the equivalent circuit is as shown in FIG. 5B.

43. The method according to claim 26, wherein the equivalent circuit is as shown in FIG. 6.

44. A method for recalibrating a state of charge of a battery, comprising:

determining from the relationship between a parameter and a state of charge of a battery a recalibration state of charge of the battery at which the relationship between the parameter and the state of charge of the battery has an inflection point;

measuring a voltage and a current of the battery during a period of time to create a set of voltage and current data;

processing the set of voltage and current data to create a set of processed data;

regressing the set of processed data with respect to an equation which is representative of the battery to obtain a value of a second derivative of the parameter; and recalibrating the state of charge of the battery to the recalibration state of charge of the battery when the second derivative of the parameter has a value of zero.

45. The method according to claim 44, wherein a value of zero occurs when the second derivative of the parameter transitions from positive to negative or from negative to positive.

46. The method according to claim 44, wherein said parameter is an open circuit voltage (OCV) of the battery.

* * * * *

UNITED STATES PATENT AND TRADEMARK OFFICE
CERTIFICATE OF CORRECTION

PATENT NO.   : 6,388,447 B1
DATED        : May 14, 2002
INVENTOR(S)  : A. Daniel Hall and Richard A. Hudson It is certified that error appears in the above-identified patent and that said Letters Patent is hereby corrected as shown below:

Column 3,
Line 13, "NiMHD cells" should read -- NiMH D cells --.

Column 9,
Line 11, "NiME D cell)" should read -- NiMH D cell) --.
Line 13, "/dSOC2" should read -- $/dSOC^2$ --.

Signed and Sealed this

Twenty-sixth Day of November, 2002

Attest:

JAMES E. ROGAN
Attesting Officer
Director of the United States Patent and Trademark Office